(12) United States Patent
Kuhm et al.

(10) Patent No.: US 9,016,639 B2
(45) Date of Patent: Apr. 28, 2015

(54) FIXATION CLIP

(71) Applicant: TRW Automotive Electronics & Components GmbH, Radolfzell (DE)

(72) Inventors: Michel Kuhm, Ingwiller (FR); Jeremy Jacotey, Croisy sur Seine (FR)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 0 days.

(21) Appl. No.: 14/107,000

(22) Filed: Dec. 16, 2013

(65) Prior Publication Data

US 2014/0201954 A1  Jul. 24, 2014

(30) Foreign Application Priority Data

Dec. 27, 2012 (FR) ...................... 12 62817

(51) Int. Cl.

| | |
|---|---|
| *F16L 3/22* | (2006.01) |
| *F16B 2/20* | (2006.01) |
| *F16L 3/12* | (2006.01) |
| *F16L 3/13* | (2006.01) |
| *H02G 3/32* | (2006.01) |

(52) U.S. Cl.
CPC ................ *F16B 2/20* (2013.01); *F16L 3/1203* (2013.01); *F16L 3/13* (2013.01); *H02G 3/32* (2013.01)

(58) Field of Classification Search
CPC ......... F16L 3/2235; F16L 3/223; F16L 3/237; F16L 3/227; F16L 3/23
USPC ..................... 248/68.1, 71, 62, 73, 74.1, 74.2
See application file for complete search history.

(56) References Cited

U.S. PATENT DOCUMENTS

| | | | | |
|---|---|---|---|---|
| 4,470,179 | A | * | 9/1984 | Gollin et al. ..................... 24/543 |
| 5,851,097 | A | * | 12/1998 | Shereyk et al. ............... 411/508 |
| 6,554,232 | B1 | * | 4/2003 | Macris ............................ 248/71 |
| 2004/0113041 | A1 | | 6/2004 | Hancock et al. |
| 2004/0217236 | A1 | | 11/2004 | Shibuya |
| 2006/0273229 | A1 | * | 12/2006 | Peterson ................... 248/316.5 |

FOREIGN PATENT DOCUMENTS

| | | |
|---|---|---|
| DE | 202008007632 | 9/2008 |
| EP | 1092903 | 4/2001 |
| EP | 2 131 084 | 12/2009 |
| FR | 2 525 705 | 10/1983 |
| WO | 2008/062573 | 5/2008 |

\* cited by examiner

*Primary Examiner* — Gwendolyn W Baxter
(74) *Attorney, Agent, or Firm* — Tarolli, Sundheim, Covell & Tummino LLP

(57) ABSTRACT

In a fixation clip (10) for at least one line (18), with a frame (12) which defines a receiving space (14, 14a, 14b) for the line (18), into which space the line (18) can be introduced such that the frame (12) encloses the line (18) in circumferential direction, wherein an insertion opening (16, 16a, 16b) for the line (18) is provided at the frame (12), and with at least one swivel arm (22, 22a, 22b) mounted on the frame (12), which can be moved from a holding position, in which the line (18) is fixed in the receiving space (14, 14a, 14b), in a swivel direction (S) into an assembly position in which the line (18) can be introduced through the insertion opening (16, 16a, 16b) into the receiving space (14, 14a, 14b), a web (24) is provided, which with a first end is mounted on the swivel arm (22, 22a, 22b) and with a second end is mounted on the inside of the frame (12), wherein the web (24, 24a, 24b) includes at least one joint (34, 34a, 34b) and is folded in the assembly position.

8 Claims, 3 Drawing Sheets

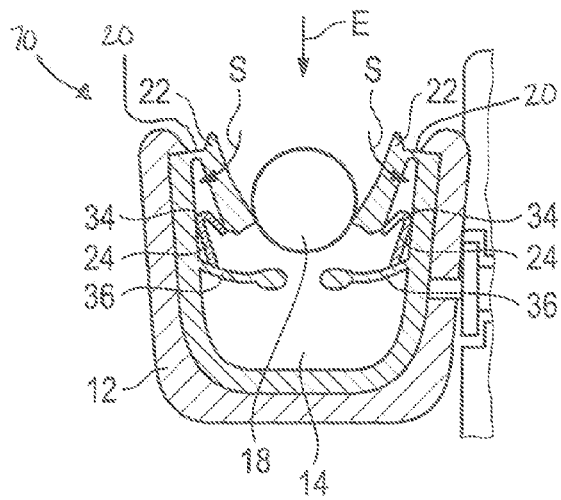 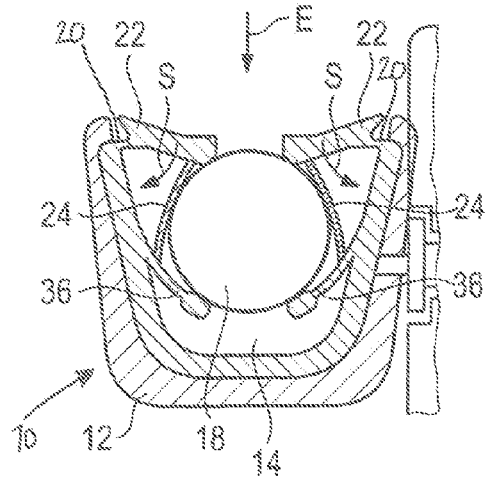
Fig. 4  Fig. 5
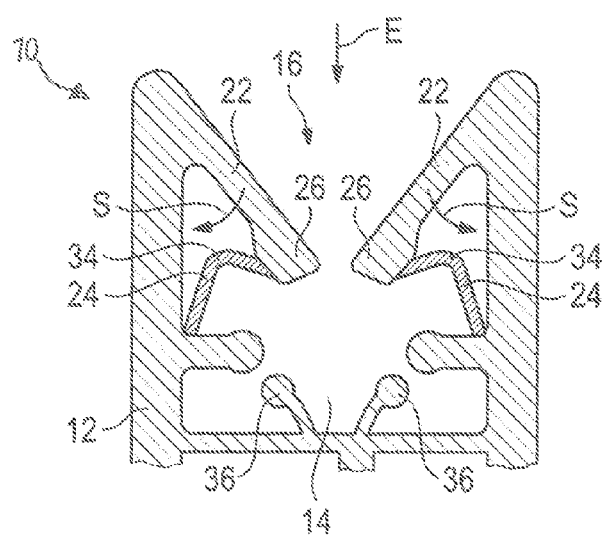
Fig. 6

FIXATION CLIP

BACKGROUND OF THE INVENTION

This invention relates to a fixation clip for at least one line, with a frame which defines a receiving space for the line, into which space the line can be introduced such that the frame encloses the line in circumferential direction, wherein an insertion opening for the line is provided at the frame, and with at least one swivel arm mounted on the frame, which can be moved from a holding position, in which the line is fixed in the receiving space, in swivel direction into an assembly position in which the line can be introduced into the receiving space through the insertion opening.

Fixation clips of this type are used to be able to fix a line, for example a cable, in a simple way. Through the insertion opening, the line can easily be inserted into the frame of the fixation clip premounted for example on an attachment part and snap into place in said frame behind the swivel arms, so that a simple, tool-less fixation of the line is possible.

In the case of high pull-out forces on the line it can occur, however, that the swivel arms are moved out of the receptacle against the swivel direction, i.e. turn over to the outside, so that the line no longer is held in the receptacle.

SUMMARY OF THE INVENTION

It is the object of the invention to provide a fixation clip which provides for an easy assembly of the line, but provides an improved fixation of the line.

For the solution of this object there is provided a fixation clip for at least one line, with a frame which defines a receiving space for the line, into which space the line can be introduced such that the frame encloses the line in circumferential direction, wherein an insertion opening for the line is provided at the frame, and with at least one swivel arm mounted on the frame, which can be moved from a holding position, in which the line is fixed in the receiving space, in swivel direction into an assembly position in which the line can be introduced into the receiving space through the insertion opening, wherein there is provided a web which with a first end is mounted on the swivel arm and with a second end is mounted on the inside of the frame, wherein the web includes at least one joint and is folded in the assembly position. The web is attached to the swivel arm and to the frame such that a movement from the holding position against the swivel direction is not possible. During such movement the web is stretched or subjected to tension and thus reliably holds the swivel arm in the holding position. The joint provided in the web has the advantage that when pivoting the swivel arm into the assembly position the web can easily be folded together, so that when pivoting the swivel arm into the assembly position the web provides no resistance and in addition can be folded in a space-saving manner.

In particular in a generic fixation clip it furthermore is provided in accordance with the invention that at the swivel arm and/or at the frame a protrusion can be provided, which during pivoting of the swivel arm from the holding position against the swivel direction comes to abut against a contact surface at the frame and/or at the swivel arm and blocks pivoting of the swivel arm against the swivel direction. In combination with the contact surface this protrusion has the same effect as a web according to the invention, namely that pivoting of the swivel arm against the swivel direction out of the receiving space is prevented. The protrusion can be arranged for example outside the receiving space or on the outside of the frame. This offers the advantage that within the frame no additional components are present, whereby the receiving space can completely be utilized for the line.

The swivel arm preferably is mounted at an edge of the insertion opening, so that in the holding position the same can close the insertion opening or at least reduce the width of the insertion opening to such an extent that pulling out the line from the receiving space is not possible.

It is also possible that two swivel arms are provided, which are provided at opposite edges of the insertion opening and which are pivoted in opposite directions into the assembly position. On the one hand, this provides for a better hold of the line. On the other hand, the insertion opening can be designed larger, as the same can be closed by both swivel arms, whereby larger lines can be inserted into the fixation clip and the fixation clip can be used more flexibly.

The web preferably is stretched in the holding position and is subjected to tension during further pivoting of the swivel arm out of the receiving space, so that no movement of the swivel arm from the holding position against the swivel direction is possible.

It is, however, also possible that the web is at least partly bent in the holding position, so that a small movement of the swivel arm out of the holding position is possible, wherein in each case however pivoting of the swivel arm out of the receiving space is prevented. In particular, the web can rest against the line with a bent portion, so that the line additionally is supported by the web. In addition, pretensioning of the web can be effected by the inserted line, so that the same is subjected to tension and pivoting of the swivel arm out of the receiving space is prevented.

In the frame, additional supporting tabs can be provided, which apply a spring force onto the line, so that the line is resiliently mounted in the frame. In addition, these supporting tabs can serve as tolerance compensation with lines of different sizes.

BRIEF DESCRIPTION OF THE DRAWINGS

Further advantages and features can be taken from the following description in conjunction with the attached drawings, in which:

FIG. 4 shows a second embodiment of a fixation clip according to the invention during the assembly of a line, FIG. 5 shows the fixation clip of FIG. 4 with a line which has a larger diameter, FIG. 6 shows a third embodiment of a fixation clip according to the invention.

DESCRIPTION OF EMBODIMENTS

Figure 1A:
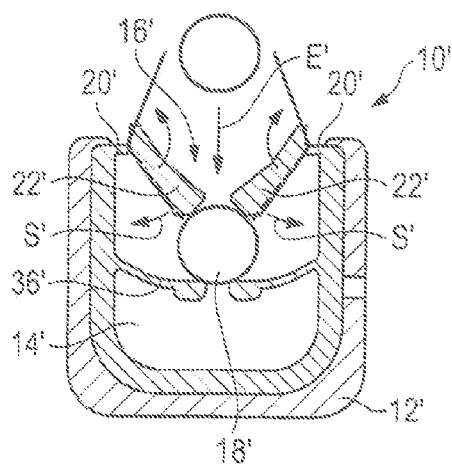
FIGS. 1a and 1b show a fixation clip from the prior art.
Figure 1B:
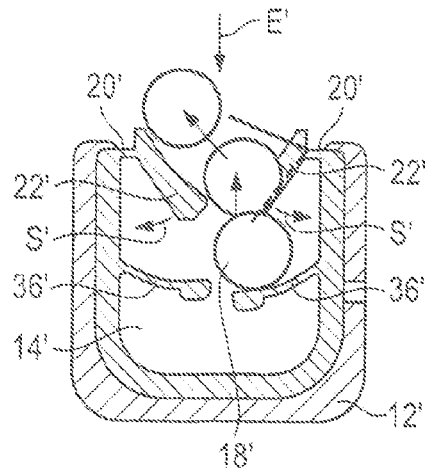

FIGS. 1a and 1b show a fixation clip 10' from the prior art. The fixation clip has a frame 12' which in the embodiment shown here is formed substantially square and defines a receiving space 14'.

The frame 12' has an interruption in circumferential direction U, which forms an insertion opening 16' through which a line 18' can be inserted into the receiving space 14'. At the edges 20' of the receiving opening 16' a swivel arm 22' each is provided, which from the holding position shown here can be moved in a swivel direction S' into the receiving space 14' to assume an assembly position, in which the line 18' can be inserted into the receiving space 14' in an insertion direction E'. When the line 18' is inserted completely, the swivel arms 22' spring back into the holding position against the swivel direction S', so that the line 18' is fixed in the receiving space 14'.

In the receiving space 14' supporting tabs 36' furthermore are provided, which rest against the line 18' and prevent a movement of the line 18' in the receiving space 14' or provide for an adaptation of the receiving space 14' or the fixation clip 10' to lines 18' of different sizes.

With high pull-out forces on the line 18' against the insertion direction E' it can occur, however, that the swivel arms 22' are moved out of the receiving space 14' against the swivel direction S', i.e. turn over to the top with respect to FIG. 1a, so that the line 18' is not fixed in the receiving space 14' (FIG. 1a).

Furthermore, the line 18' can be shifted laterally in the receiving space 14', so that in the case of a tensile force against the insertion direction E' an individual swivel arm 22' also can be moved against the swivel direction S', whereby a fixation of the line 18' is not ensured (FIG. 1b).

Figure 2:
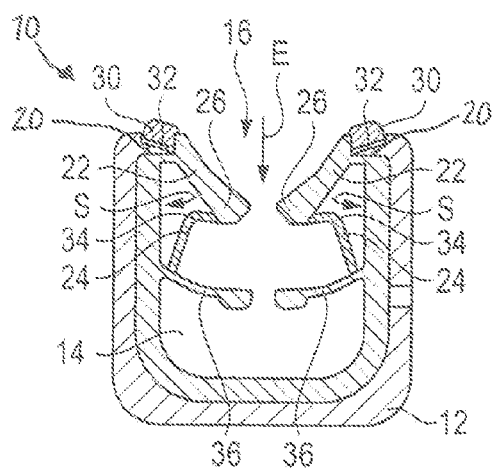
FIG. 2 shows a fixation clip according to the invention.

The construction of the fixation clip 10 according to the invention as shown in FIG. 2 substantially corresponds to the construction of the fixation clip shown in FIGS. 1a and 1b, so that the same reference numerals are used for identical components. In addition, however, this fixation clip 10 includes two webs 24 which extend from the front end 26 of the swivel arms 22 in the receiving space 14 up to the side walls of the frame 12.

The webs 24 each are pivotally attached to the frame 12 or to the swivel arm 22. In addition, each web 24 includes a joint 34 by which the web 24 is divided into two portions movable relative to each other. In the illustrated holding position, the portions of the webs 24 are arranged L-shaped to each other.

Furthermore, a protrusion 30 each is provided at the connecting region of the swivel arms 22 to the frame 12, which, as will be explained below, can cooperate with a contact surface 32 arranged at the frame 12.

When the swivel arms 22 are pivoted from the holding position into the assembly position during insertion of the line 18, the webs 24 due to the flexible attachment to the swivel arm 22 or to the frame 12 as well as the joints 34 can be folded together in a space-saving manner, so that the swivel arms 22 can be pivoted maximally and thus can clear an insertion opening 16 as large as possible (see also FIG. 4). Due to the L-shape of the portions of the webs 24 easy folding together of the webs 24 is ensured.

When the line 18 is completely inserted into the receiving space 14, the swivel arms 22 can spring back into the holding position against the swivel direction S, in which holding position the insertion opening 16 is closed substantially by the swivel arms 22. Springing back can be supported by the webs 24. In a preferred embodiment, however, these webs 24 do not provide a spring function, so that easy pivoting of the swivel arms 22 into the assembly position is possible.

When the line 18 is pulled out of the receiving space 14 against the insertion direction E, the swivel arms 22 are moved against the swivel direction S, until the webs 24 are stretched. When the webs 24 are stretched completely, the same block further pivoting of the swivel arms 22 against the swivel direction S, so that turning over of the swivel arms 22 against the swivel direction S out of the receiving space 14 is not possible. Thus, a much larger force can act on the line 18 against the insertion direction E, without the fixation in the fixation clip 10 being at risk.

Additional blocking of the swivel arms 22 against the swivel direction S is effected by the protrusions 30. When the swivel arms 22 are moved against the swivel direction S, the protrusions 20 get in abutment with the contact surfaces 32. When the protrusions 30 rest against the contact surfaces 32, the same block further pivoting of the swivel arms 22 against the swivel direction S. Thus, turning over of the swivel arms 22 out of the receiving space 14 is reliably prevented.

Figure 3:
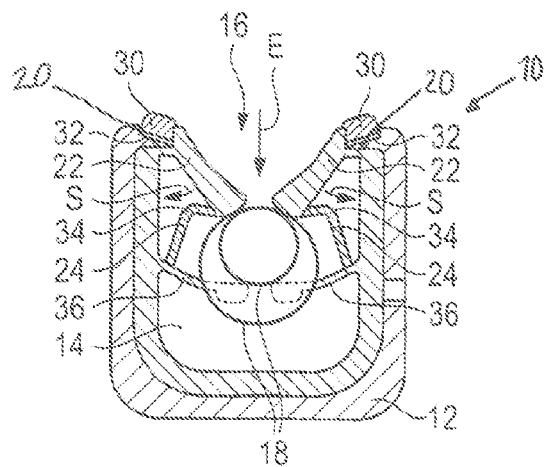
FIG. 3 shows the fixation clip of FIG. 2 with a line held in the fixation clip.

The embodiment of the fixation clip 10 as shown in FIGS. 4 and 5 differs from the embodiment according to FIGS. 2 and 3 in that the webs 24 are not attached to the frame 12, but to the supporting tabs 36. Furthermore, no protrusions 30 are provided.

As can be seen in particular in FIG. 5, the webs 24 in this embodiment are formed such that in the holding position of the swivel arms 22 the same are substantially stretched, but sectionally extend in an arc-shaped manner, wherein the webs 24 sectionally rest against the line 18 and additionally hold or fix the same in the receiving space 14. The line 18 thus is held almost completely in circumferential direction by the supporting tabs 36, the webs 24 and the swivel arms 22, so that the position of the line 18 in the receiving space 14 is reliably fixed.

As in the embodiment shown here the webs 24 support on the line 18, further stretching of the webs 24, by which pivoting of the swivel arms 22 against the swivel direction S would be possible, is not possible, so that pivoting of the swivel arms 22 out of the receiving space 14 is prevented.

The embodiment shown in FIG. 6 likewise includes no protrusions 30 or no contact surfaces 32, but merely webs 24. In addition, the supporting tabs 36 are not provided on the side walls 28, but at the bottom of the frame 12. The number and the position of the supporting tabs, however, can be varied as desired, in order to ensure a rather good fixation of the line 18 in the receiving space 14.

In addition, embodiments with merely one swivel arm 22, which is held at one of the two edges 20 of the frame 12, also are possible.

Figure 7:
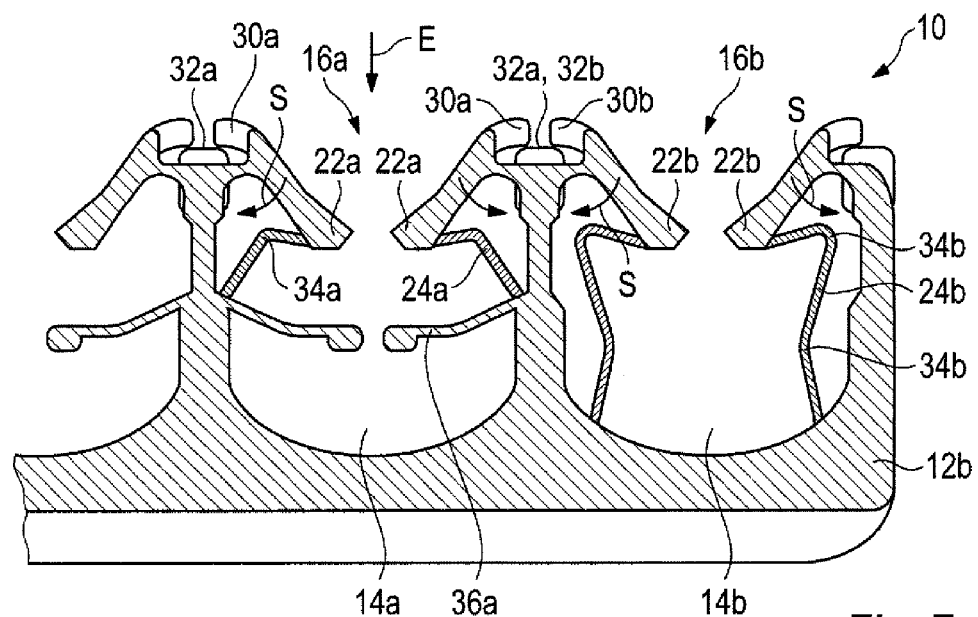
FIG. 7 shows a fourth embodiment of a fixation clip according to the invention.

Furthermore, fixation clips 10 with a plurality of receiving spaces 14 are possible, which are arranged one beside the other. Such embodiment is shown in FIG. 7, wherein two receiving spaces 14a, 14b are shown completely.

The arrangement of the swivel arms 22a, the webs 24a, the protrusions 30a as well as the supporting tabs 36a in the first receiving space 14a substantially corresponds to the construction of the fixation clip of FIG. 2.

In the second receiving space 14b no additional supporting tabs are provided. The webs 24b here include two joints 34b and are attached to the bottom of the frame 12b. In this receiving space 14b the line 18 is enclosed by the webs 24b in circumferential direction U and is fixed by said webs in the receiving space 14b.

Figure 8:
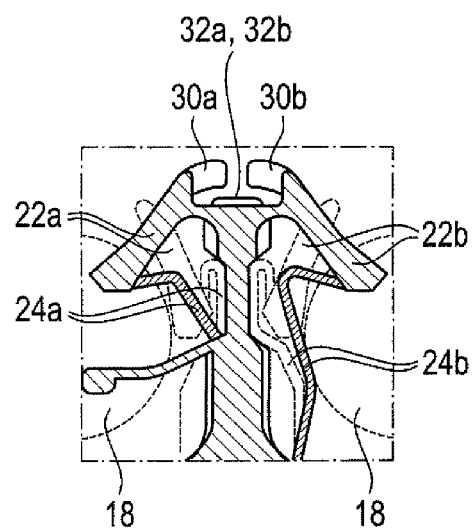
FIG. 8 shows a detail view of the fixation clip of FIG. 7, in which the swivel arms are in an assembly position.
Figure 9:
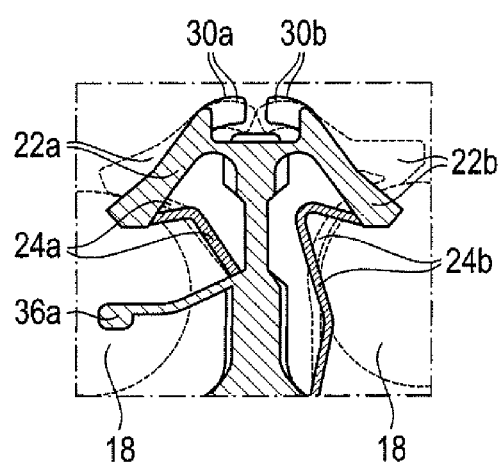
FIG. 9 shows a detail view of the fixation clip of FIG. 7, in which the swivel arms are in a holding position.

In FIGS. 8 and 9 the swivel arms 22a, 22b are shown in a preassembly position and in the assembly position (broken lines), in which the same are pivoted in swivel direction S and the webs 24 are folded together.

In FIG. 9, the swivel arms 22a, 22b are shown in a holding position (broken lines). The web 24b of the second receptacle 14b completely rests against the line 18 in circumferential direction, so that said line is fixed in the receiving space 14b by the web 24.

The invention claimed is:

1. A fixation clip (10) for at least one line (18), with a frame (12) which defines a receiving space (14, 14a, 14b) for the line (18), into which space the line (18) can be introduced such that the frame (12) encloses the line (18) in circumferential direction, wherein an insertion opening (16, 16a, 16b) for the line (18) is provided at the frame (12), and at least one swivel arm (22, 22a, 22b) is mounted to pivot at an opening edge (20a, 20b) of the insertion opening (16, 16a, 16b), wherein the swivel arm (22, 22a, 22b) can be moved from a holding position, in which the line (18) is fixed in the receiving space (14, 14a, 14b), in a swivel direction (S) into an assembly position in which the line (18) can be introduced into the receiving space (14, 14a, 14b) through the insertion opening (16, 16a, 16b), wherein a web (24, 24a, 24b) is provided having a first end mounted to a front end (26) of the swivel arm (22, 22a, 22b), opposite its mounting at the opening edge (20a, 20b) and a second end is mounted on the inside of the frame (12), wherein the web (24, 24a, 24b) includes at least one joint (34, 34a, 34b) for dividing the web into portions movable relative to one another and is folded about the joint (34) in the assembly position.

2. The fixation clip (10) according to claim 1, wherein at the swivel arm (22, 22a, 22b) a protrusion (30, 30a, 30b) is provided, which during pivoting of the swivel arm (22, 22a, 22b) from the holding position against the swivel direction (S) of the swivel arm (22, 22a, 22b) comes to abut against a contact surface (32, 32a, 32b) at the frame (12) and blocks pivoting of the swivel arm (22, 22a, 22b) against the swivel direction (S).

3. The fixation clip according to claim 1, wherein two swivel arms (22, 22a, 22b) are provided, which are provided at opposite edges (20, 20a, 20b) of the insertion opening (16, 16a, 16b).

4. The fixation clip according to claim 1, wherein the web (24, 24a, 24b) is stretched in the holding position.

5. The fixation clip according to claim 1, wherein the web (24, 24a, 24b) is at least partly bent in the holding position and in particular rests against the line (18).

6. The fixation clip according to claim 1, wherein the frame (12) at least one supporting tab (36, 36a, 36b) is provided, which can apply a spring force onto the line (18).

7. The fixation clip (10) according to claim 1, wherein at the frame (12) a protrusion (30, 30a, 30b) is provided, which during pivoting of the swivel arm (22, 22a, 22b) from the holding position against the swivel direction (S) of the swivel arm (22, 22a, 22b) comes to abut against a contact surface (32, 32a, 32b) at the swivel arm (22, 22a, 22b) and blocks pivoting of the swivel arm (22, 22a, 22b) against the swivel direction (S).

8. A fixation clip for at least one line comprising:
- a frame defining a receiving space for the line and an insertion opening connected to the receiving space;
- at least one swivel arm including a first end having a pivotable connection to the frame and a second end extending into the receiving space, each swivel arm being pivotable between an assembly position in which the line extends through the insertion opening and engages the at least one swivel arm to urge the at least one swivel arm towards the frame and a holding position in which the at least one swivel arm fixes the line in the receiving space; and
- a web extending from the at least one swivel arm at a position spaced from the pivotable connection between the swivel arm and the frame, the web including at least one joint allowing portions of the web to move relative to one another, the web being folded about the joint when the at least one swivel arm is in the assembly position.

* * * * *